Sept. 11, 1956    D. L. CONING ET AL    2,762,229
DRIVE MECHANISM FOR REFRIGERATING APPARATUS
Filed April 1, 1955    4 Sheets-Sheet 1

INVENTORS
Donald L. Coning
BY James W. Jacobs

Their Attorney

Sept. 11, 1956  D. L. CONING ET AL  2,762,229
DRIVE MECHANISM FOR REFRIGERATING APPARATUS
Filed April 1, 1955  4 Sheets-Sheet 2

INVENTORS
Donald L. Coning
BY James W. Jacobs

RRCandor

Their Attorney

Sept. 11, 1956 D. L. CONING ET AL 2,762,229
DRIVE MECHANISM FOR REFRIGERATING APPARATUS
Filed April 1, 1955 4 Sheets-Sheet 3

INVENTORS
Donald L. Coning
BY James W. Jacobs
R R Candor
Their Attorney

INVENTORS
Donald L. Coning
James W. Jacobs
BY
Their Attorney

United States Patent Office 2,762,229
Patented Sept. 11, 1956

2,762,229
DRIVE MECHANISM FOR REFRIGERATING APPARATUS

Donald L. Coning, New Lebanon, and James W. Jacobs, Dayton, Ohio, assignors to General Motors Corporation, Detroit, Mich., a corporation of Delaware Application April 1, 1955, Serial No. 498,678

10 Claims. (Cl. 74—336.5)

This invention relates to refrigerating apparatus and more particularly to a clutch and switch arrangement for driving a compressor or the like from an automobile engine or the like, to prevent excessive variations of compressor speeds under varying engine speeds.

An object of this invention is to provide a high speed ratio drive, and a low speed ratio drive between the drive shaft of the engine and the driven shaft of the compressor, together with a two-speed magnetic clutch selectively clutching said drives to said driven shaft in response to driven shaft speed, and to provide inertia means to prevent hunting of the magnetic clutch due to the deceleration of the driven shaft following down shift of the clutch.

Another object of this invention is to provide a switch responsive to driven shaft speed, and automatically and selectively energizing two rotating solenoids on the shaft, and the switch being provided with inertia locking means for preventing hunting of the switch due to deceleration of the shaft following down shifting of the clutch.

Further objects and advantages of the present invention will be apparent from the following description, reference being had to the accompanying drawings wherein a preferred form of the invention is clearly shown.

Figure 1:
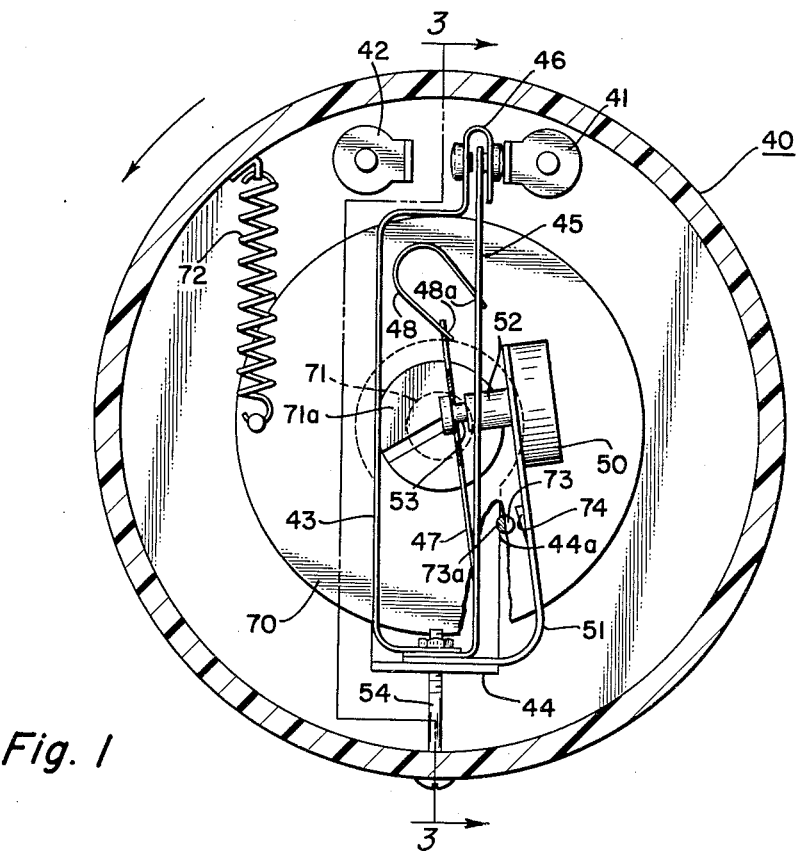
Figure 1 is a vertical transverse cross-section of the switch in first position.

A power unit, such as an automobile engine 10, is provided with a driving shaft 11. The driving shaft 11 has relatively great running inertia because of the weight of the engine parts, etc. A driven unit 12, such as a refrigerant compressor, has a driven shaft 13 with relatively small running inertia, due to the relatively small weight of the compressor, and due to the compressing action. A high speed ratio drive is placed between the shafts 11 and 13, and preferably is in continuous driving connection with the shaft 11 through the medium of pulley 15. A low speed ratio drive is placed between the shafts 11 and 13 and preferably is in continuous driving connection with the driving shaft 11 through the medium of pulley 17. The high speed ratio drive may also include high speed pulley 20 over which the belt 21 of the high speed drive passes. The low speed ratio drive may also include a low speed driving pulley 22 over which the low speed drive belt 23 passes. The pulleys 20 and 22 are relatively rotatably mounted about the shaft 13, and are adapted to be clutched selectively to said shaft in a manner to be described.

Figure 2:
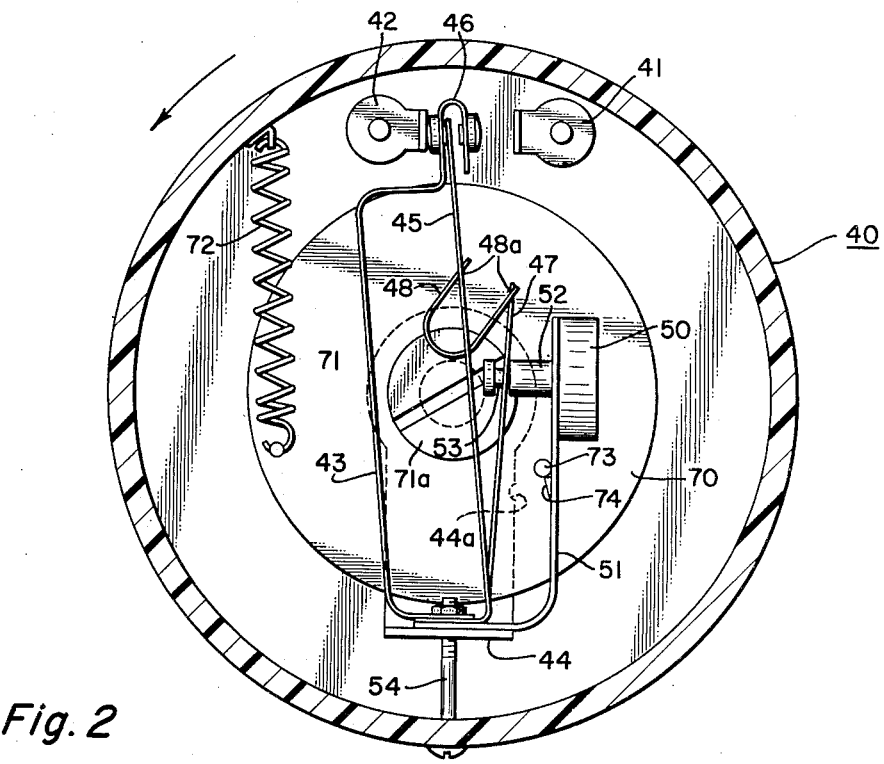
Figure 2 is a view similar to Figure 1, but with the switch in second position.

A first locking means 30 is placed between the high speed ratio driving member or pulley 20 and the driven member or shaft 13. A first solenoid 31 rotates about the shaft axis of shaft 13 and actuates the first locking means 30 through the medium of an armature disk 32 and other members in any suitable manner of a magnetic clutch and preferably as disclosed in the copending, and simultaneously filed, application Serial No. 498,598, filed April 1, 1955, of James W. Jacobs for Refrigerating Apparatus. A second locking means 35 is placed between the low speed ratio driving member 22 and the driven member or shaft 13. A second solenoid 36 is rotatably mounted about the shaft axis and actuates the second locking means 35 through the medium of an armature disc 37 or the like, together with other parts of a magnetic clutch, such as disclosed in the said copending application. A centrifugal switch, generally indicated as 40, is mounted on the driven shaft 13 through a plate 13a and has a first position, as indicated in Figure 1, and a second position, as indicated in Figure 2, energizing respectively the first and second solenoids 31 and 36. This is accomplished by providing a stationary contact 41 connected to the first solenoid 31 and a second stationary contact 42 connected to the second solenoid 36. A resilient blade 43 is mounted on the base 44 which rotates with the shaft 13 or plate 13a, and is biased towards contact 41. A second blade 45 is also mounted on base 44 and has its end held within the loop 46 of the blade 43. The blade 45 snaps and carries with it the blade 43 from contact 41 as in Figure 1 to contact 42 as in Figure 2.

The blade 45 is part of a unitary metal piece which also includes a blade 47 within the blade 45. The C-spring 48 has tongue and slot connections 48a with the blades 45 and 47, to cause a snap action as the blades pass their dead-center positions.

A centrifugal weight 50 is carried by a spring blade 51. The weight 50 has a rigid connector 52 having a lost motion slot 53 connecting it with the blade 47. The blade 51 is also carried by the base 44 and all of the blades preferably are secured to the base by the bolt 54.

Figure 7:
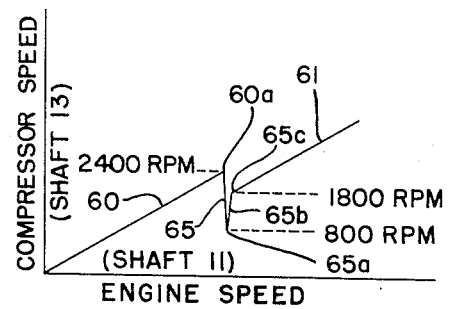
Figure 7 is a speed diagram showing the relative speeds between the engine and compressor.

Assuming that the clutch is in first position (Figure 1), the driven shaft 13, or plate 13a accelerates proportionally to the engine speed as indicated by the line 60 of Figure 7. When the shaft 13 reaches the speed of 2400 R. P. M. at 60a, the centrifugal weight 50 snaps the switch from the first position of Figure 1 to the second position shown in Figure 2. This action deenergizes the first solenoid 31, and energizes the second solenoid 36. This, in turn, unlocks the clutch locking means 30 and locks the clutch locking means 35. However, there is a slight pause, or loss of drive, during this down-shifting action, and during such pause the speed of driven shaft 13 very quickly drops, as shown by line 65, to some speed such as 800 R. P. M. at point 65a until the down-shift is completed, at which time the speed of the shaft 13 of plate 13a quickly rises along line 65b, due to the completion of the clutch lock to the lower drive speed of 1800 R. P. M. at 65c, and from that time on the shaft 13 will accelerate in proportion to engine speed as indicated by the line 61.

However, the speed of 2400 R. P. M. at 60a being a first predetermined shaft speed at which the down-shift occurs, and the speed of 1800 R. P. M. at 65c being a lower second predetermined shaft speed limit at which the clutch normally upshifts, it is obvious that the clutch would immediately upshift when the shaft speed would drop to the point 60a or 800 R. P. M. due to the normal action of the weight 50 except for the inertia holding means to be described. Such inertia means are responsive to the sudden deceleration of the shaft, as shown by line 65, during the down-shift of the clutch. The inertia means temporarily holds the switch in the second position (Figure 2) until after an acceleration of the shaft 13 occurs following the completion of the down-shift, as indicated by the line 65b up to the second predetermined shaft speed limit of 65c.

The inertia means may take the form of a disk 70 of considerable weight loosely mounted within the switch 40 on a screw shaft 71 on the shaft axis of shaft 13. The shaft 71 may be provided with a head 71a for retaining the disk 70 from axial displacement. The disk 70 is free to rotate slightly against the pull of the tension spring 72, during a sudden deceleration such as indicated by line 65 of Figure 7. This sudden deceleration causes the disk 70 to rotate relatively to the switch 40 from the position shown in Figure 1 to the position shown in Figure 2, at which time the pin 73 on the disk 70 rides past the latch 74 on the blade 51. This temporarily locks the switch in the second position shown in Figure 2 until such time as the shaft 13 accelerates upon the completion of the down-shift to a speed above the second speed limit of 65c, at which time the blade 51 tends to pull away from the pin 73, and this allows the spring 72 to pull the disk 70 back to the position of Figure 1, since at that time there is no tendency for the disk 70 to rotate counterclockwise with respect to the switch 40, as was the case during deceleration. The effect of the pull of spring 72 on disk 70 is limited when the end 73a of pin 73 engages the edge 44a of base 44 as shown in the broken away portion of Figure 1.

The compressor 12 preferably is adapted to be a part of an automobile air conditioning system, which may include a condenser 80, an evaporator 81 and a thermostatic expansion valve 82 in refrigerant flow relationship with the compressor 12. The condenser 80 may be cooled by the engine radiator fan 83. The centrifugal switch 40 may have a button 84, which receives the screw shaft 71. The button 84 engages the stationary contact 85 on the axis of the shaft 13. The contact 85 may be the electrical input into the switch which continues through the base 44 and the blades 43 and/or 45 to the output contacts 41 and 42.

Figure 5:
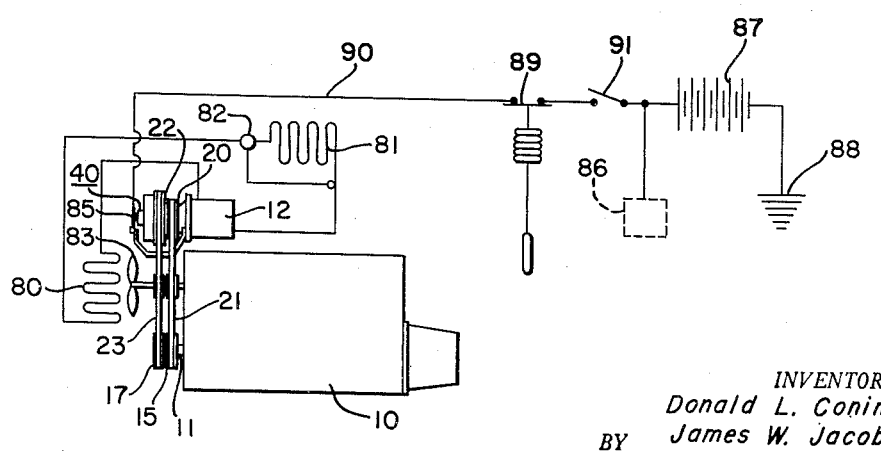
Figure 5 is a diagrammatic view showing the engine, compressor and drives, together with the air conditioning system.
Figure 6:
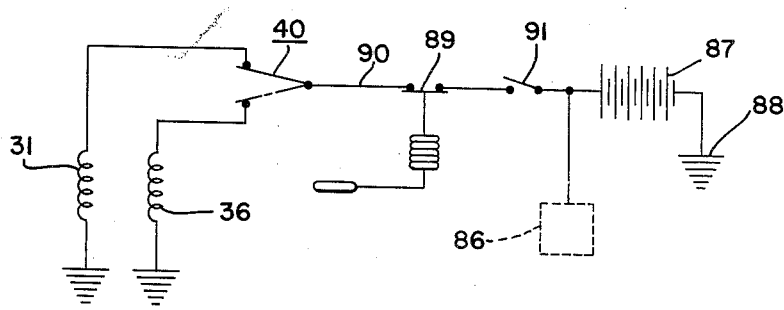
Figure 6 is a wiring diagram of a portion of the electrical system.
Figure 3:
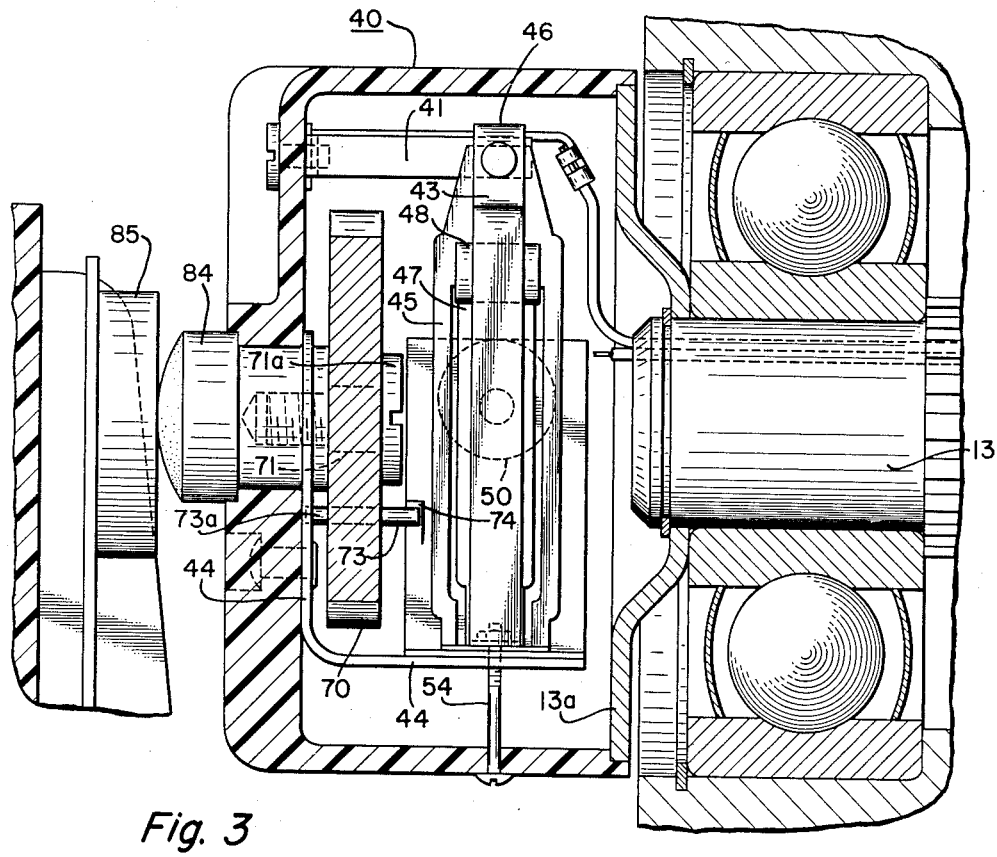
Figure 3 is a vertical longitudinal cross-section taken along the line 3—3 of Figure 1.
Figure 8:
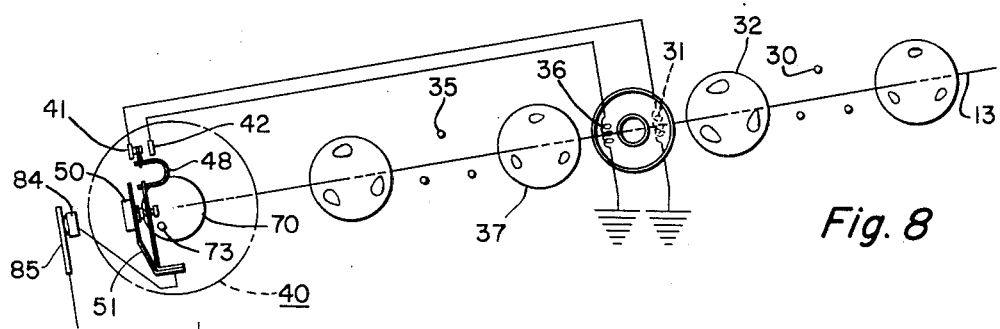
Figure 8 is an exploded diagrammatic view of the switch and clutch.

The usual automobile electrical system is indicated partially by the dotted square 86 (Figure 5), which is connected to the usual battery 87 grounded at 88. A thermostatic switch 89 may be responsive to compartment temperatures and closes at a predetermined high temperature of the compartment and opens at a predetermined low temperature of the compartment. The line 90 leads to the stationary contact 85, through the switch 40, selectively to the first and second solenoids 31 and 35 (Figures 4 and 6) heretofore described. A manual switch 91 may be provided to turn the air conditioning system on or off.

Figure 4:
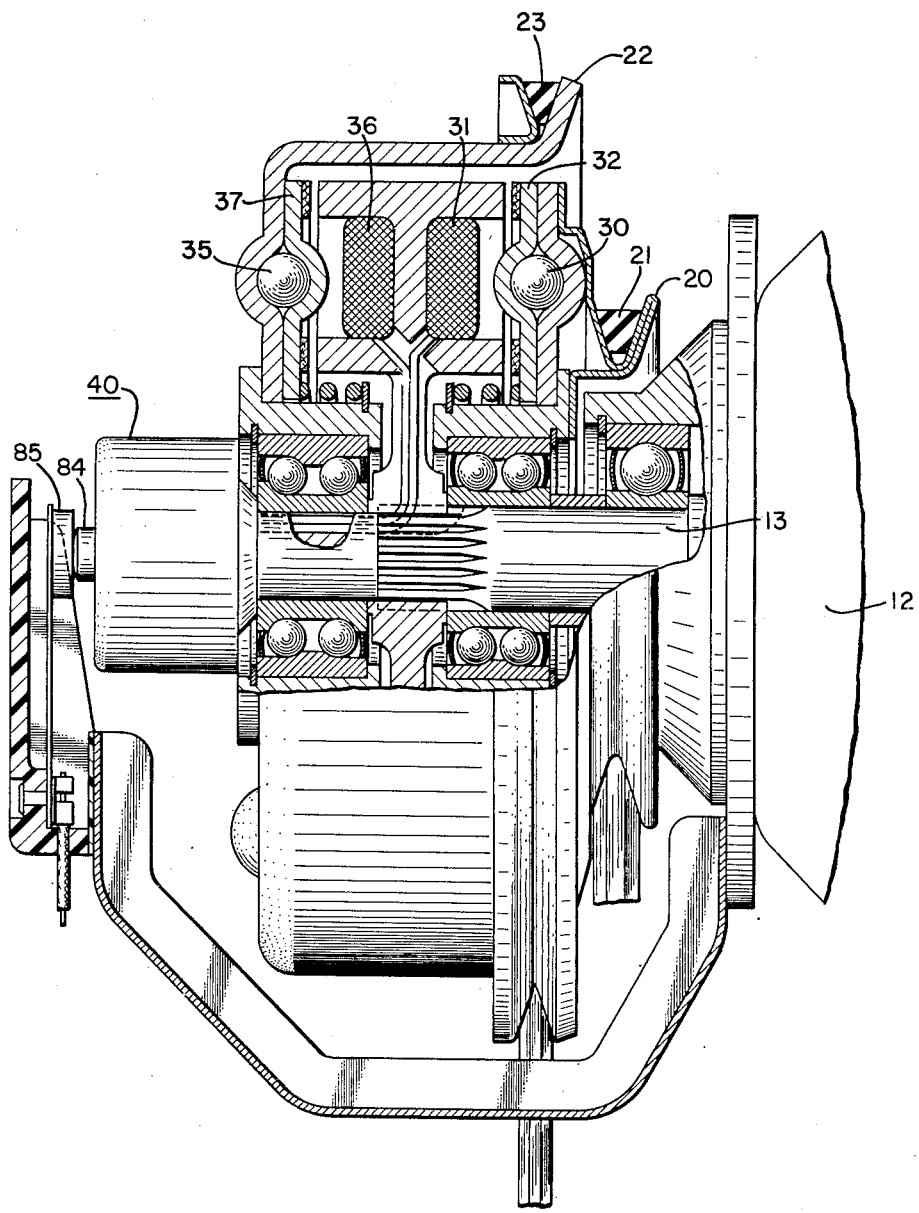
Figure 4 is a view, partly in cross-section and partly in elevation, showing the switch combined with the magnetic clutch and compressor.

Further details of the centrifugal switch 40, the clutch shown in Figure 4 of the air conditioning system, and of the electrical system may be the same as disclosed in the said copending application of James W. Jacobs where not inconsistent with the disclosure in the instant application.

In the operation of the device, when the engine is accelerating gradually as indicated by the line 60 (Figure 7), the switch 40 is in the position shown in Figure 1 until the speed of shaft 13 reaches 2400 R. P. M., indicated at 60a, Figure 7, at which time the weight 50 snaps the switch to the position shown in Figure 2. A sudden deceleration of shaft 13 immediately takes place, as indicated by the line 65, due to the lag between the declutching of the first clutch and the clutching of the second clutch, so that the speed of shaft 13 reaches the point 65a, or 800 R. P. M., before the second clutch becomes effective. Ordinarily at such a shaft speed, the weight 50 would tend to return the switch to the position shown in Figure 1. However, during the sudden deceleration shown in point 65a, the inertia disk or weight 70 continues to rotate at high speed, and moves relatively counterclockwise with respect to the switch 40, against the tension of spring 72 until the pin 73 is latched against latch 74. When the shaft 13 begins to accelerate suddenly due to the engagement of the second clutch, as indicated by line 65b, the weight 50 flies out and when the point 65c is reached, the weight 50 has moved out enough to allow the pin 73 and the inertia weight 70 to be pulled back by the spring 72 to the original position of Figure 1. This unlocks the switch for free movement between first and second positions in response to shaft speed until again locked by a recurrence of the cycle.

While the form of embodiment of the invention as herein disclosed constitutes a preferred form, it is to be understood that other forms might be adopted as may come within the scope of the claims which follow.

What is claimed is as follows:

1. In combination: a driven shaft having a shaft axis; a high speed ratio driving member mounted to rotate about said shaft axis; a low speed ratio driving member mounted to rotate about said shaft axis; first locking means between said high speed ratio driving member and said driven member; a first solenoid rotating about said shaft axis and actuating said first locking means; second locking means between said low speed ratio driving member and said driven member; a second solenoid rotating about said shaft axis and actuating said second locking means; a centrifugal switch mounted on said shaft and having a first position controlling said first solenoid and a second position controlling said second solenoid, said switch moving from said first position to said second position at a first predetermined shaft speed limit following gradual speed acceleration of said shaft and returning from said second position to said first speed position at a lower second predetermined shaft speed limit during gradual speed deceleration of said shaft; and inertia means responsive to sudden deceleration of said shaft during the down-shift of said locking means temporarily to hold said switch in second position until after an acceleration of said shaft following the completion of said down-shift.

2. In combination: a power unit having a driving shaft with relatively great running inertia; a driven unit having a driven shaft with relatively small running inertia; a high speed ratio drive between said shafts in continuous driving connection with said driving shaft; a low speed ratio drive between said shafts in continuous driving connection with said driving shaft; a two-speed magnetic clutch between said drives and said driven shaft selectively to clutch said drives to said driven shaft; a first solenoid and a second solenoid in said clutch rotatably mounted about said driven shaft and selectively causing said clutch to lock said high and low speed ratio drives to said driven shaft with a pause during the shifting of the locking action; a centrifugal switch rotating with said driven shaft and having first and second output positions connecting to said first and second solenoids respectively to control said first solenoid when said driven shaft accelerates up to a predetermined limit and to control said second solenoid when said driven shaft accelerates above such predetermined limit; and an inertia locking means in said switch automatically locking said switch in second solenoid controlling position while said driven shaft temporarily decelerates below said predetermined limit during said pause and to release said switch after said driven member accelerates after the shifting of said locking action.

3. In combination: a driven shaft having a shaft axis; a two-speed magnetic clutch having a fixed rotary driving connection with said shaft; a high speed rotary driving member and a low speed rotary driving member rotationally free on said shaft and selectively to be clutched to said shaft through said fixed driving connection; a first solenoid and a second solenoid rotatably mounted about said shaft axis and selectively locking said fixed rotary driving connection with said high and low speed rotary driving members respectively; a centrifugal switch rotated at the speed of said shaft and having a first output contact connected to said first solenoid, and a second output contact connected to said second solenoid; movable input contact means selectively movable with respect to said first and second output contacts; a centrifugal contact actuator rotated at the speed of said driven shaft and actuating said input contact means selectively relatively to said first and second output contacts; and an inertia member rotating at the speed of said shaft and automatically and temporarily holding said centrifugal contact actuator after said actuator has responded to acceleration of said shaft up to a predetermined speed limit and after said shaft has temporarily decelerated by the down-shift to clutch of said low speed driving member to said shaft.

4. In combination: a driven shaft having a shaft axis; a two-speed magnetic clutch having a fixed rotary driving connection with said shaft; a high speed rotary driving member and a low speed rotary driving member rotationally free on said shaft and selectively to be clutched to said shaft through said fixed driving connection; a first solenoid and a second solenoid rotatably mounted about said shaft axis and selectively locking said fixed rotary driving connection with said high and low speed rotary driving members respectively; a centrifugal switch rotated at the speed of said shaft and having a first output contact connected to said first solenoid, and a second output contact connected to said second solenoid; movable input contact means selectively movable with respect to said first and second output contacts; a centrifugal contact actuator rotated at the speed of said driven shaft and actuating said input contact means selectively relatively to said first and second output contacts; and an inertia member rotating at the speed of said shaft and automatically and temporarily holding said centrifugal contact actuator after said actuator has responded to acceleration of said shaft up to a predetermined speed limit and after said shaft has temporarily decelerated by the down-shift to clutch of said low speed driving member to said shaft; and automatically unlocking said actuator when said shaft has accelerated again after the completion of said down-shift.

5. In combination: a driven shaft having a shaft axis; a high speed ratio driving member mounted to rotate about said shaft axis; a low speed ratio driving member mounted to rotate about said shaft axis; first locking means between said high speed ratio driving member and said driven member; a first solenoid rotating about said shaft axis and actuating said first locking means; second locking means between said low speed ratio driving member and said driven member; a second solenoid rotating about said shaft axis and actuating said second locking means; a centrifugal switch mounted on said shaft and having a first position controlling said first solenoid and a second position controlling said second solenoid, said switch moving from said first position to said second position at a first predetermined shaft speed limit following gradual speed acceleration of said shaft and returning from said second position to said first speed position at a lower second predetermined shaft speed limit during gradual speed deceleration of said shaft; and inertia means responsive to sudden deceleration of said shaft below said lower second predetermined shaft speed limit during the down-shifting of said locking means temporarily to hold said switch in second position until after an acceleration of said shaft above said second predetermined shaft speed limit following the completion of said down-shift.

6. In combination: a driven shaft having a shaft axis; a high speed ratio driving member mounted to rotate about said shaft axis; a low speed ratio driving member mounted to rotate about said shaft axis; first locking means between said high speed ratio driving member and said driven member; a first solenoid rotating about said shaft axis and actuating said first locking means; second locking means between said low speed ratio driving member and said driven member; a second solenoid rotating about said shaft axis and actuating said second locking means; a switch mounted on said shaft and having a first position controlling said first solenoid and having a second position controlling said second solenoid; a centrifugal weight moving said switch from said first position to said second position at a first predetermined shaft speed limit following gradual speed acceleration of said shaft, and returning said switch from said second position to said first position at a lower second predetermined shaft speed limit; and inertia means responsive to sudden deceleration of said shaft during the down-shift of said locking means causing said weight temporarily to hold said switch in second position until after an acceleration of said shaft following completion of said down-shift.

7. In combination: a shaft; a switch mounted on said shaft and having a first position adapted to control a first electrical member on said shaft, and having a second position adapted to control a second electrical member; a centrifugal weight moving said switch from said first position to said second position at a first predetermined shaft speed limit following gradual speed acceleration of said shaft, and returning said switch from said second position to said first position at a lower second predetermined shaft speed limit; and inertia means responsive to sudden deceleration of said shaft causing said weight temporarily to hold said switch in second position until after an acceleration of said shaft.

8. In combination: a shaft; a switch mounted on said shaft and having a first position adapted to control a first electrical member on said shaft, and having a second position adapted to control a second electrical member; a centrifugal weight moving said switch from said first position to said second position at a first predetermined shaft speed limit following gradual speed acceleration of said shaft, and returning said switch from said second position to said first position at a lower second predetermined shaft speed limit and an inertia weight responsive to sudden deceleration of said shaft causing said centrifugal weight temporarily to hold said switch in second position until after an acceleration of said shaft.

9. In combination: a shaft; a switch mounted on said shaft and having a first position adapted to control a first electrical member on said shaft, and having a second position adapted to control a second electrical member; a centrifugal weight moving said switch from said first position to said second position at a first predetermined shaft speed limit following gradual speed acceleration of said shaft and returning said switch from said second position to said first position at a lower second predetermined shaft speed limit; and inertia means responsive to sudden deceleration of said shaft causing said weight temporarily to hold said switch in second position until after an acceleration of said shaft at a speed above said lower second predetermined shaft speed limit.

10. In combination: a shaft; a switch mounted on said shaft and having a first position adapted to control a first electrical member on said shaft and having a second position adapted to control a second electrical member; a centrifugal weight moving said switch from said first position to said second position at a first predetermined shaft speed limit following gradual speed acceleration of said shaft, and returning said switch from said second position to said first position at a lower second predetermined shaft speed limit; and an inertia weight responsive to sudden deceleration of said shaft causing said centrifugal weight temporarily to hold said switch in second position until after an acceleration of said shaft at a speed above said lower second predetermined shaft speed limit.

References Cited in the file of this patent

UNITED STATES PATENTS

| | | |
|---|---|---|
| 1,671,057 | Brainard | May 22, 1928 |
| 2,234,309 | Kromholz | Mar. 11, 1941 |
| 2,421,213 | Moody | May 27, 1947 |
| 2,513,674 | Price | July 4, 1950 |
| 2,605,877 | Winther | Aug. 5, 1952 |